(12) United States Patent
Helwig

(10) Patent No.: US 6,968,806 B2
(45) Date of Patent: Nov. 29, 2005

(54) ANIMAL SOOTHING SYSTEM WITH HEARTBEAT SIMULATION DEVICE

(76) Inventor: Michele M. Helwig, 10159 S. Knoll Cir., Highlands Ranch, CO (US) 80130

( * ) Notice: Subject to any disclaimer, the term of this patent is extended or adjusted under 35 U.S.C. 154(b) by 0 days.

(21) Appl. No.: 10/075,530

(22) Filed: Feb. 13, 2002

(65) Prior Publication Data

US 2002/0117115 A1   Aug. 29, 2002

Related U.S. Application Data

(60) Provisional application No. 60/270,614, filed on Feb. 23, 2001.

(51) Int. Cl.[7] ............................................. A01K 1/035
(52) U.S. Cl. ...................................... 119/28.5; 601/57
(58) Field of Search ........................ 119/28.5, 856–859, 119/707; 601/46, 56–57; 446/295; D24/183, D24/200

(56) References Cited

U.S. PATENT DOCUMENTS

| | | | | | |
|---|---|---|---|---|---|
| 2,859,731 A | * | 11/1958 | Sutton | ........................ | 119/174 |
| 3,298,132 A | * | 1/1967 | Elwell | ........................ | 446/295 |
| 4,257,408 A | * | 3/1981 | Ramey | ........................ | 601/46 |
| 4,649,861 A | * | 3/1987 | Elkins et al. | ............... | 119/28.5 |
| 4,718,876 A | * | 1/1988 | Lee | ............................. | 446/295 |
| 4,742,799 A | * | 5/1988 | Schlitz | ........................ | 119/707 |
| 4,947,832 A | * | 8/1990 | Blitzer | .......................... | 5/109 |
| 5,007,410 A | * | 4/1991 | DeLaney | ........................ | 5/694 |
| 5,784,995 A | * | 7/1998 | Willinger | .................... | 119/28.5 |
| 5,865,771 A | * | 2/1999 | Shuto et al. | .................... | 5/904 |
| 6,024,407 A | * | 2/2000 | Eakin | ....................... | 297/217.4 |
| 6,142,963 A | * | 11/2000 | Black et al. | .................. | 601/56 |
| 6,173,675 B1 | * | 1/2001 | Licciardo | .................... | 119/28.5 |
| 6,189,487 B1 | * | 2/2001 | Owen et al. | ............... | 119/28.5 |
| 2002/0095103 A1 | * | 7/2002 | Blue | ............................. | 601/46 |

* cited by examiner

*Primary Examiner*—Robert P. Swiatek
(74) *Attorney, Agent, or Firm*—Townsend and Townsend and Crew LLP

(57) ABSTRACT

An animal soothing system including an animal bedding structure having a pocket formed therein, and a soothing device for generating soothing rhythmic vibrations disposed in the pocket of the bedding structure to communicate the soothing vibrations to animals lying on the bedding structure is provided. In one embodiment the bedding structure is a mattress or pad, and the soothing device is a battery powered heartbeat simulator with a pressure sensitiye switch to activate the simulator when an animal lies upon the bedding and deactivate the simulator when the animal rises from the bedding.

19 Claims, 5 Drawing Sheets

US 6,968,806 B2

ANIMAL SOOTHING SYSTEM WITH HEARTBEAT SIMULATION DEVICE

RELATED APPLICATION

The present application is related to and claims the benefit of U.S. Provisional Patent Application Serial No. 60/270,614, filed in the United States Patent and Trademark Office on Feb. 23, 2001, and titled, "Soothing Mechanism Insert For Pets With Heartbeat Simulation".

FIELD OF THE INVENTION

The present invention generally relates to pet animal bedding systems, and in its preferred embodiments more specifically relates to an animal soothing system with an internal, removable mechanism for producing soothing rhythmic vibration and/or sound.

BACKGROUND OF THE INVENTION

Many animals kept as pets are gregarious by nature and may become uncomfortable or distressed when alone. This is particularly the case with animals, such as but not limited to puppies, that have recently been removed from their mothers and litter mates and are experiencing the lack of constant companionship for the first time. Puppies, for example, often become very distressed when left alone, and communicate their discomfort by yipping, crying, or howling. Many mature animals as well appear to be much happier with companionship. There has been a long recognized need for a means of soothing or calming animals in solitary situations, for the comfort of both the animal and the owner.

One often suggested approach to solving this problem is placing a loudly ticking clock in the animal's bedding, in an effort to simulate the sound of the heartbeat of a mother animal or littermate. This approach, though occasionally helpful, is far from fully satisfactory. A ticking clock does not closely replicate the sound of a heart and does not provide any tactile sensation, and is often completely ineffective in soothing the animal. Other approaches to soothing a distressed animal, such as placing a source of heat in the bedding, are also usually not very effective and can create a risk of injury to the animal.

Heartbeat simulator devices, which produce either or both rhythmic vibration and sound, are known in the prior art, but the teaching of the prior art regarding such devices is toward their use solely by or for humans. The use of such a device for soothing infants is exemplified by U.S. Pat. No. 4,718,876, which discloses a child calming toy, in the form of a stuffed animal or the like, with an internal device that produces a rhythmic movement and sound to simulate a heartbeat. The heartbeat simulator device has a pressure sensitive switch that activates the simulator when the toy is hugged or its chest is pressed by a child. Although appropriate for a child, the toy disclosed by this patent is not well suited for soothing an animal, because of the configuration of the stuffed toy. The prior art has not addressed the use of such devices for soothing animals or the provision of and has not addressed the different needs and requirements for effectively soothing and comforting animals.

SUMMARY OF THE INVENTION

The present invention provides a very effective solution to the problem of soothing a solitary animal and encouraging it to remain quietly in its bedding. In its preferred embodiments the invention provides a battery operated heartbeat simulation device which, upon activation, will create both rhythmic vibration and a soft "thumping" sound to approximately reproduce the sensations experienced by the animal when it is lying close to its mother and/or litter mates, removably positioned within a mattress, pillow, or other appropriate bedding material. It is preferred that the heartbeat simulation device include a pressure actuated switch, to active the device when the switch is depressed by the weight of the animal and deactivate the device when the weight is removed, it is also preferred that the surface area on the surface area which may be depressed to activate the switch be relative large, as compared to, e.g., a small button, so that pressure on any portion of the switch area will activate the device. Although the soothing device could be provided with a simple on-off switch, a pressure activated switch is preferred so that the device will operate only in response to the weight of an animal lying on the bedding, thereby prolonging battery life and eliminating the need for human intervention.

Although a heartbeat simulator is contemplated to be the most effective manifestation of a soothing device for most animals, it should be understood that other sound or sensation producing devices may be used. As non-limiting examples, a device that produces purring sounds may be very effective for cats and kittens, a device that produces soft voice-like sounds to suggest the close presence of a human may be effective for some animals, a device that produces sounds like flowing liquids may be effective, or a device that produces a continuous mild vibration may be used.

It is preferred that the heartbeat simulator or other soothing sensation producing device be removably disposed in the interior of an animal bedding structure, such as a foam filled mattress, with an access opening to allow the sensation producing device to be easily placed in and removed from the bedding structure. It is preferred that the access opening have a zippered or hook and loop closure, to help assure that the device would remain in place within the bedding structure. It is common for animal mattresses or pillows to be provided with a removable, washable cover over the filler material, and that typical design would be suitable for use in the context of the present invention. It is preferred that the bedding structure be formed with a shallow recess in the filler material or with a pocket sewn to or otherwise formed in the cover to receive the soothing device in a generally central position and restrain it from slipping to one side or to a corner of the bedding.

It is contemplated, and suggested, that the physical size of the bedding selected for a particular animal be appropriate to the size of the animal, so that the animal will occupy the majority of the bedding surface when lying on it. Selection of the appropriate bedding size not only assists in making the animal feel more secure, it also assures that the body of the reclining animal will cause the switch of the soothing device to be depressed so that the device will be activated whenever the animal is lying upon the bedding. As a young animal grows, the soothing device can readily be transferred to larger bedding. As an alternative, a relatively shape retentive thin sheet or plate generally equal in size and configuration to the surface of the bedding may be positioned in the bedding overlying the soothing device and in direct contact with, or connected to, the pressure sensitive switch, so that the weight of an animal lying anywhere on the bedding will cause the plate to deform and depress the switch to activate the device. When the animal leaves the bedding and the weight is removed the plate will spring back to its original configuration, relieving pressure on the switch and deactivating the soothing device.

The structure and features of the soothing system of the invention will be described in more detail with reference to the accompanying drawing figures.

DETAILED DESCRIPTION OF THE INVENTION

Figure 1:
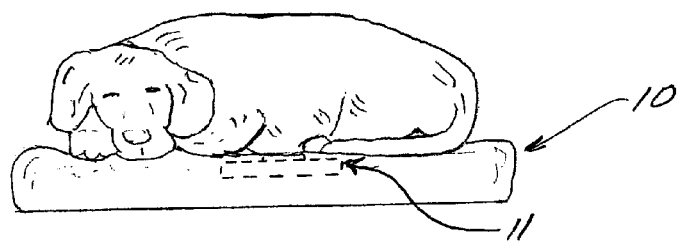
FIG. 1 is a side view showing an animal lying on bedding with the soothing device of the invention therein.
Figure 3:
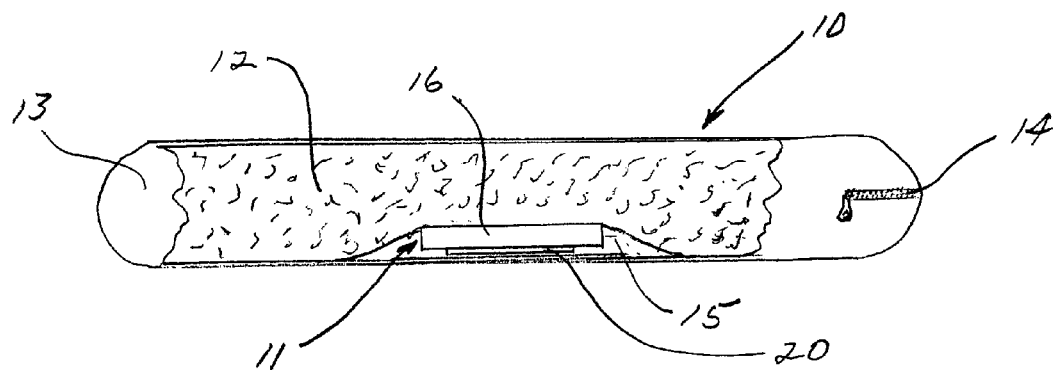
FIG. 3 is a partially cut-away side elevation view showing an alternative placement of the soothing device in an animal mattress.
Figure 4:
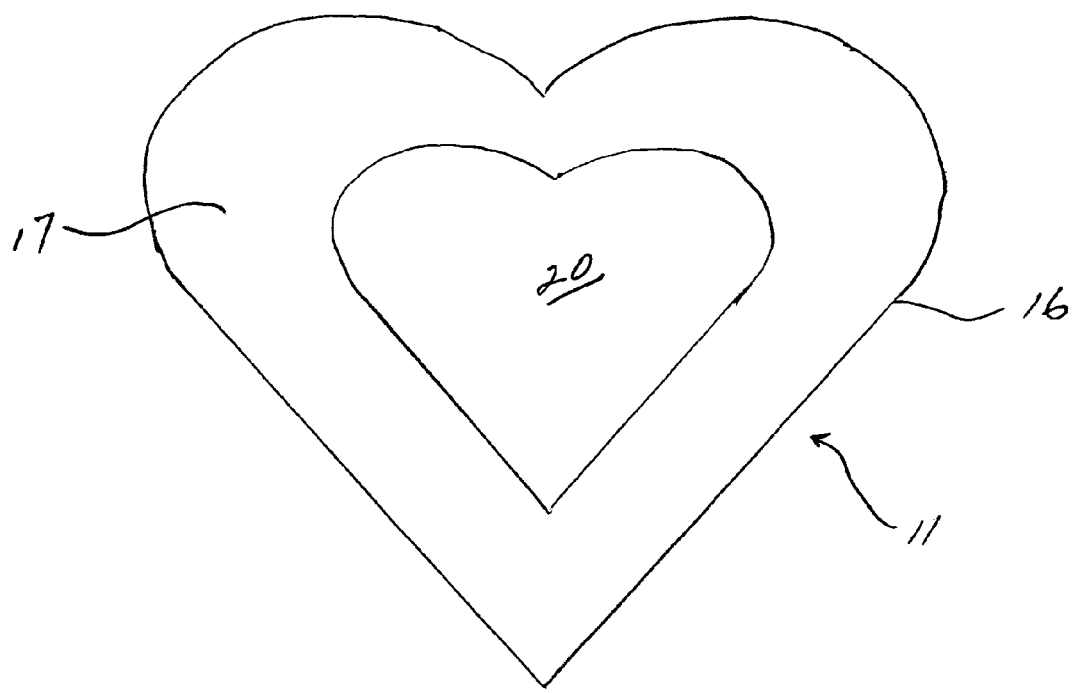
FIG. 4 is a top plan view of the preferred embodiment of the soothing device of the invention.
Figure 5:
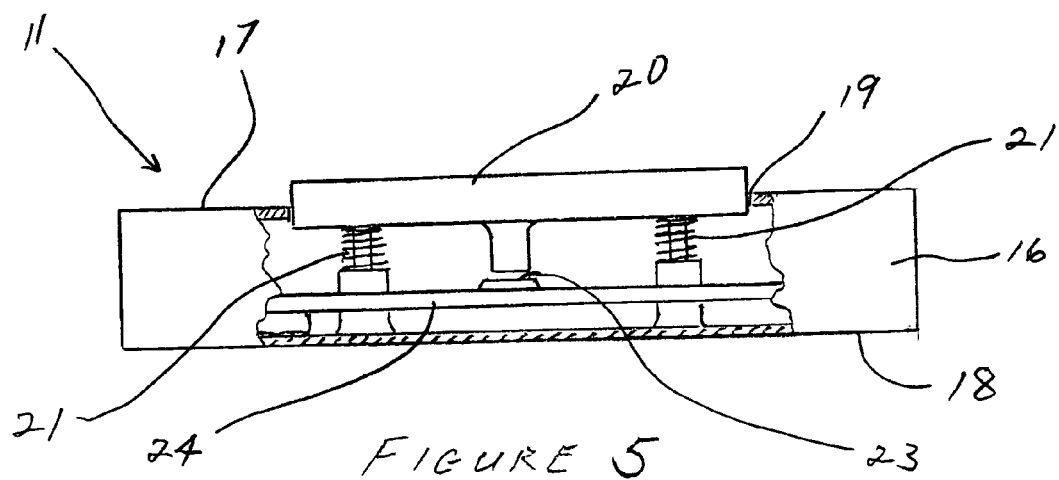
FIG. 5 is a side elevation view of the preferred embodiment of the soothing device of the invention.
Figure 6:
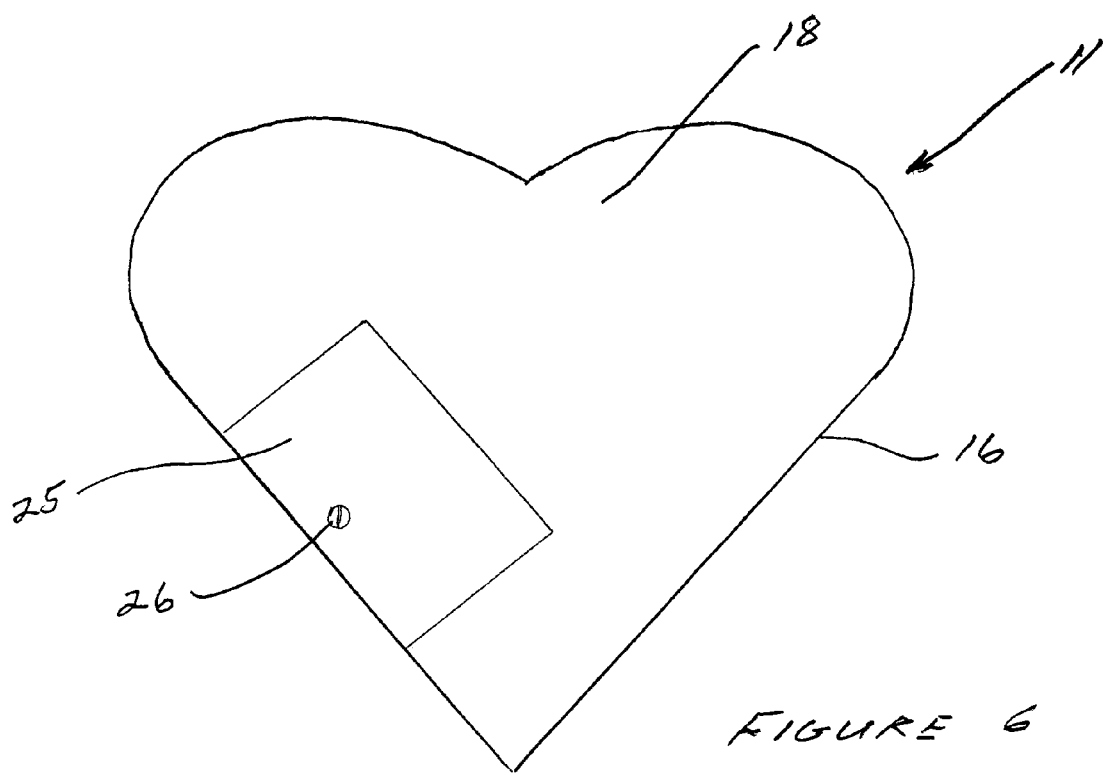
FIG. 6 is a bottom plan view of the preferred embodiment of the soothing device of the invention.

The general context of the invention is illustrated by FIG. 1, which shows a dog lying upon a bedding structure, generally identified by reference numeral 10, with a soothing device, generally identified by numeral 11 and shown in phantom, placed therein so that it is immediately under the animal. A bedding structure and the soothing device are shown in a partially cut-away view in FIG. 2, and with the soothing device in an alternative placement in FIG. 3, and the preferred embodiment of the soothing device component is shown in FIGS. 4, 5, and 6.

Figure 2:
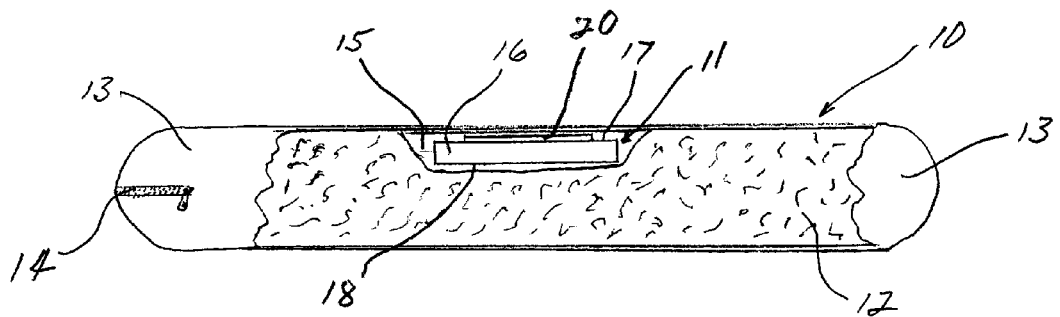
FIG. 2 is a partially cut-away side elevation view of the preferred embodiment, showing an animal mattress with the soothing device disposed therein.

Referring to FIG. 2, the illustrated bedding structure 10, in the form of an animal mattress or pillow, includes filler material 12 disposed within a cover 13. The cover includes a closeable access opening 14 for access to the interior of the cover and the filler. The closure means for the access opening is preferably a zipper, although other closure means, such as strips of hook and loop material, could be used if desired. It is preferred that a retaining area 15, such as a shallow cavity formed in the upper face of the filler, be provided to receive the soothing device. As an alternative to the formation of a cavity in the filler, the retaining area may be provided by forming a pouch or pocket in the cover, as shown in FIG. 3. It is not essential that the preferred cavity be specifically formed during the construction of the bedding structure, and with many types of filler material a suitable cavity may be formed by simply nesting the soothing device into the filler material. It is preferred that the soothing device not be directly connected to either the filler material or to the cover of the bedding structure, to facilitate replacement of batteries and to allow easy movement of the soothing device to another bedding structure.

The soothing device component of the invention includes a case 16, preferably formed of a strong and rigid plastic material, with an upper face 17 and a lower face 18. In the drawing figures the soothing device is shown in a fanciful heart-shaped configuration, but it will be readily understood that the particular configuration of the device is not material to the invention, and any desired configuration, such as round or rectangular, could readily be used. The upper face of the soothing device includes an aperture 19 in which a spring biased activation button 20 is disposed. In FIG. 5 the activation button is biased in a raised position by coil springs 21, but any convenient biasing means may be used. When the activation button is depressed by the imposition of force to its upper surface, stem 22 is brought into contact with a switch 23 to activate a sound and/or tactile sensation generating mechanism, generally identified with reference numeral 24, disposed in the interior of case 16.

Figure 9:
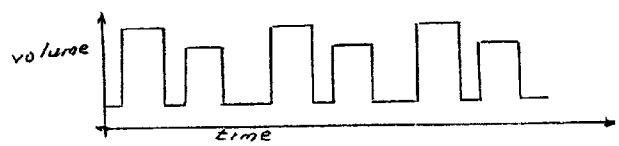
FIG. 9 is a waveform diagram of a preferred sound pattern to be produced by the soothing device component of the invention.
Figure 10:
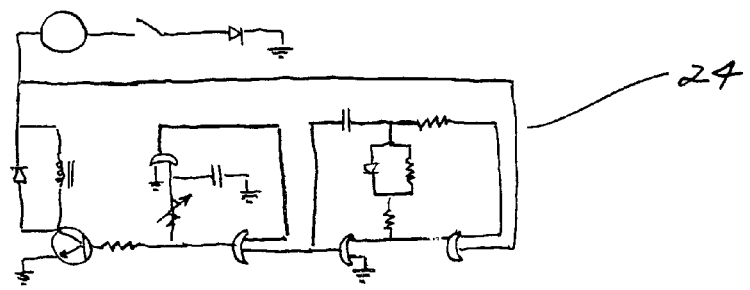
FIG. 10 is a schematic diagram of an illustrative circuit for a soothing device suitable for use in the context of the invention.

In the preferred embodiment of the invention the sensation generating mechanism is selected to produce a rhythmic pulse and sound in a pattern which simulates the sensation of a beating heart. An illustrative waveform for simulated heartbeats is shown in FIG. 9, though it should be understood that a variety of sound and/or pulse patterns, and waveforms, could be generated by a suitable mechanism within the scope of the invention. For purposes of non-limiting illustration, FIG. 10 provides a schematic diagram of a circuit suitable for producing the waveform of FIG. 9.

The sensation generating mechanism of the soothing device is preferably battery powered, and the case 16 includes a battery access door 25, as shown in FIG. 6, which is held in place by appropriate retaining means, such as screw 26. Because the soothing device will be actuated, and thus draw power from the battery or batteries, only when activation button is depressed by the placement of weight on it, the life of the batteries is greatly extended in comparison to a device that does not include the pressure activated switch feature of the preferred embodiment of the invention.

Nevertheless, the invention is not necessarily limited to a soothing device with a pressure activated switch, and other means of activation are comprehended within the intended scope of the invention. Although not considered to be desirable because of battery drain, a simple on-off switch such as a slide switch or a rocker switch could be used. Within the scope of switches that are activated in response to the presence of an animal, a heat activated switch could also be used.

Figure 7:
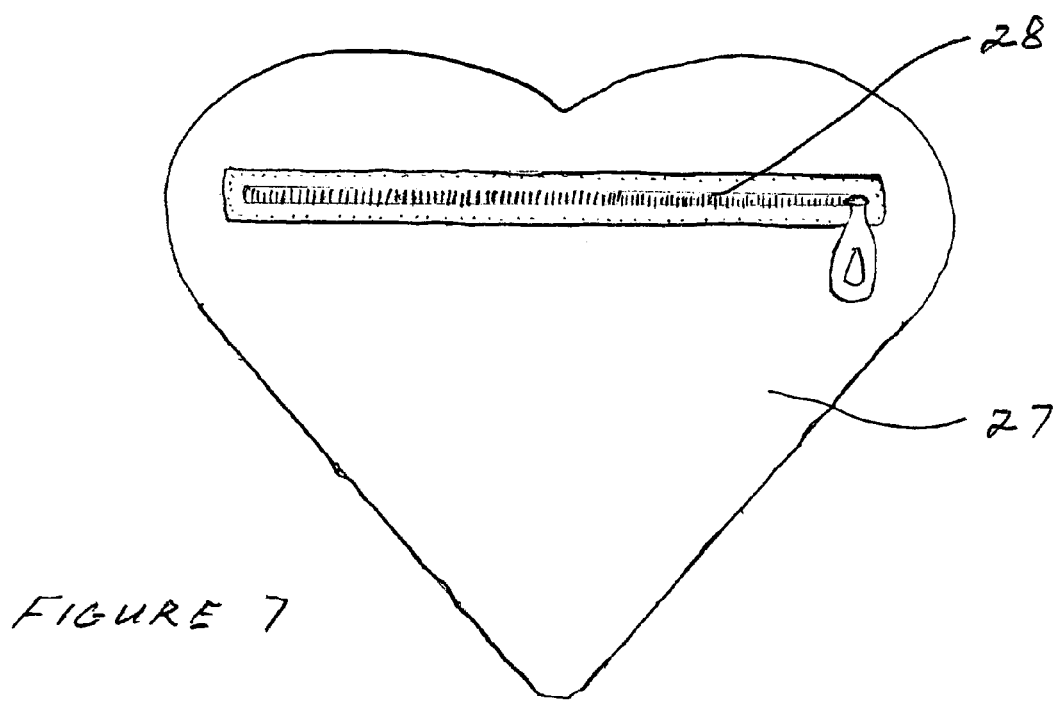
FIG. 7 is a plan view of an optional pouch for use with the soothing device of the invention.

It is preferred that the soothing device of the invention be placed in a pouch or other protective cover before the device is placed in the animal bedding, to protect it against the entry of foreign matter that could interfere with the operation of the activation button, and against liquids that could damage the sensation generating mechanism. FIG. 7 illustrates a suitable pouch 27 with a closeable opening 28 for insertion of the soothing device. The opening is preferably provided with a zipper or other suitable closure means. It is preferred that the pouch be formed of a fabric or plastic material that will resist the entry of dirt and liquids, but that is sufficiently flexible that it will not interfere with the transfer of force to the activation button.

To use the system of the invention to provide soothing and calming sensations for an animal, the soothing device, with the necessary battery or batteries in place therein, is placed in animal bedding or other structure just below the face of the bedding or other surface upon which an animal will recline, with the activation button of the soothing device facing outwardly. To best assure that the animal for which the system is used will activate the soothing device when the animal lies upon the bedding, it is preferred that the size of the bedding structure used be appropriate to the size of the animal, generally as shown in FIG. 1. Appropriate bedding selection assures that the soothing device will be below the animal when the animal lies on the bedding, and thus assures that the weight of the animal will depress the activation button of the device. Alternatively, the soothing device may be positioned adjacent to the lower face of the bedding, as shown in FIG. 3, with the pressure sensitive switch facing downward and adjacent to the floor or rigid base of an animal bed or other enclosure. If this positioning alternative is used the strength of the springs 21 or other biasing means should be sufficient that the weight of the bedding material will not alone cause the switch to depress and activate the soothing device, but the added weight of the animal will do so. A soothing device appropriate for use in the system of the invention is readily capable of producing sensations of sufficient strength to be felt and/or heard through the thickness of the bedding.

Figure 8:
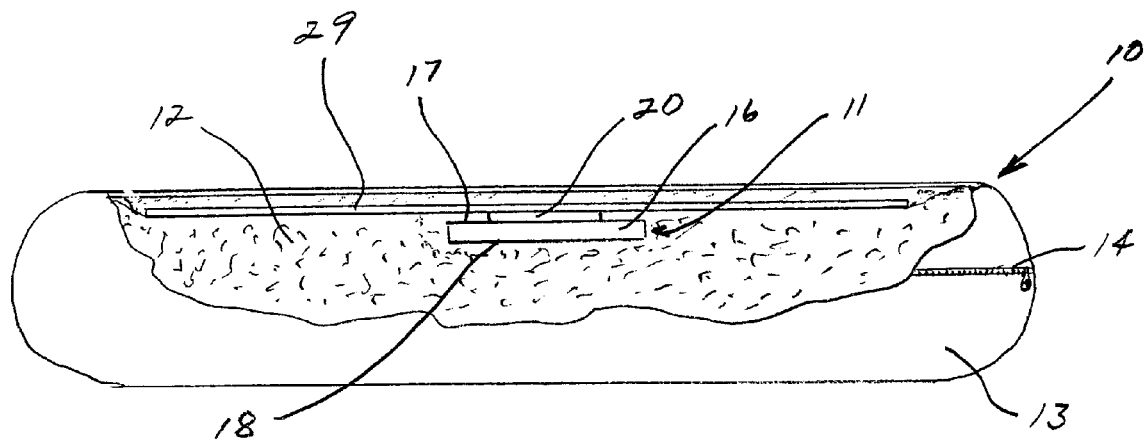
FIG. 8 is a sectioned side elevation view of an alternative embodiment, showing animal bedding with a soothing device and an activation plate disposed therein.

An alternative structural embodiment of the invention, illustrated in FIG. 8, may be used, especially when the user desires that the soothing device be in close proximity to the animal, to accommodate the use of a bedding structure which may be significantly larger than the animal, and still assure that the animal will activate the soothing device when it lies on the bedding. In this alternative embodiment a thin plate 29 may be placed in the bedding structure immediately over the soothing device, and in contact with the activation button 20. Plate 29 is shape retentive, with sufficient flexibility that it will "bow" downwardly in response to force applied to its upper surface, and will return to its original shape when the force is removed. When an animal lies on the bedding above any portion of the plate, the plate will be caused to deform sufficiently to depress activation button 20 and activate the soothing device. When the animal leaves the bedding the plate will return to its original position, releasing the activation button and deactivating the device. If desired, a layer of cushioning material may be placed on the upper face of the plate, for comfort of the animal. In addition to assuring activation of the device, the plate will act to distribute the sensation generated by the soothing device through the area of the plate, since the vibration and/or sound from the soothing device is transmitted to the plate through the direct contact between them.

Figure 11:
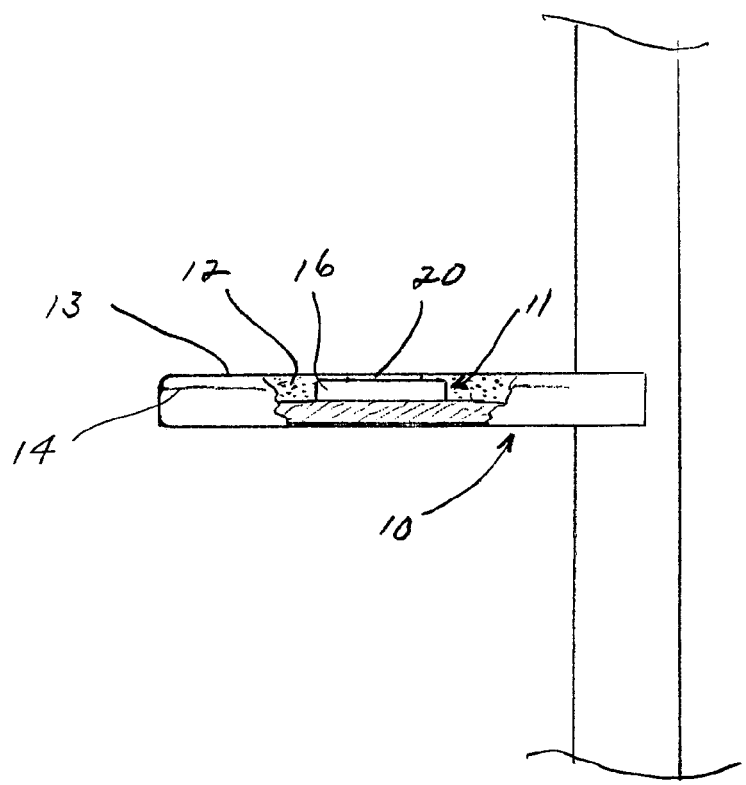
FIG. 11 is a partial side elevation view of a further alternative embodiment, showing the soothing device of the invention disposed in a resting platform for a climbing animal.
Figure 12:
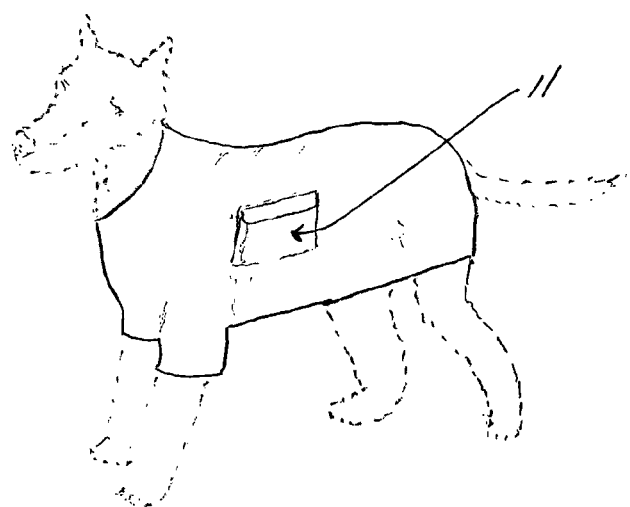
FIG. 12 illustrates another alternative embodiment, in which the soothing device is disposed in a wearable structure, such as a dog sweater.

Although the foregoing description of the system of the invention has referred to animal bedding such as mattresses, the applicability of the system is not limited to use in only that context. The bedding material may be essentially any structure upon which an animal may recline, such as pads or mats for use in kennels, doghouses, carriers, or cages. The bedding material may also encompass padding used on resting perches or platforms built into climbing structures for cats, as illustrated in FIG. 11. It is also contemplated that a soothing device may be incorporated in wearable items for animals, such as collars, covers, wraps, or sweaters, as generally shown in FIG. 12.

The foregoing description of the preferred and alternative embodiments is intended to be illustrative and is not for purposes of limitation of the scope of the invention. In addition to the variations described, the invention is susceptible to a range of other variations and to alternative embodiments of the described components thereof, all of which are intended to encompassed within the scope of the invention as claimed.

What is claimed is:

1. An animal soothing system comprising
   a bedding structure for animals to lie upon, said bedding structure having one of a heart-shaped, round, or rectangular exterior configuration, said bedding structure including foam filler material, the filler material including a cavity that is permanently formed in an upper face of the filler material, the open cavity to receive artificial soothing means; and
   the soothing means generating rhythmic soothing vibrations and removably disposed in the open cavity, to communicate said vibrations to animals lying upon said bedding structure.

2. The animal soothing system of claim 1, wherein said soothing means comprises a heartbeat simulator device.

3. The animal soothing system of claim 2, wherein said heartbeat simulator device is battery powered.

4. The animal soothing system of claim 3, wherein said heartbeat simulator device includes a pressure sensitive switch for activation thereof when the animal places its weight upon said bedding structure and for deactivation thereof when the animal removes its weight from said bedding structure.

5. The animal soothing system of claim 1, wherein said bedding structure includes a cover surrounding said filler material, said cover having an access opening for access to the interior thereof and to said filler material.

6. The animal soothing system of claim 1, wherein said bedding structure has an upper face, upon which an animal may lie, and an opposed lower face to be received against a supporting surface upon which the bedding structure is placed, and wherein said open cavity and said soothing means disposed therein are adjacent to said upper face of said bedding structure.

7. The animal soothing system of claim 1, wherein said bedding structure has an upper face, upon which an animal may lie, and an opposed lower face to be received against a supporting surface upon which the bedding structure is placed, and wherein said open cavity and said soothing means disposed therein are adjacent to said lower face of said bedding structure.

8. The animal soothing system of claim 1, wherein said bedding structure comprises a mattress.

9. The animal soothing system of claim 1, wherein said bedding structure comprises a pillow.

10. The animal soothing system of claim 1, wherein said rhythmic vibrations comprise sound waves.

11. The animal soothing system of claim 10, wherein said sound waves are generated in a pattern simulating the sound of a beating heart.

12. The animal soothing system of claim 10, wherein said sound waves are generated in a pattern simulating the sound of a cat purring.

13. The animal soothing system of claim 1, wherein said rhythmic vibrations comprise a combination of tactilely perceptible vibrations and sound waves.

14. An animal soothing system comprising:
    a bedding structure for animals to lie upon said bedding structure having one of a heart-shaped, round, or rectangular exterior configuration, said bedding structure including foam filler material having an open cavity permanently formed therein and a cover, the cover surrounding and enclosing said filler material, the open cavity to receive artificial soothing means; and the soothing means generating rhythmic soothing vibrations and removably disposed in the cavity, to communicate said vibrations to animals lying upon said bedding structure.

15. The animal soothing system of claim 14, wherein said soothing means comprises a heartbeat simulator device.

16. The animal soothing system of claim 15, wherein said heartbeat simulator device includes a pressure sensitive switch for activation thereof when the animal places is weight upon the cover structure.

17. The animal soothing system of claim 14, wherein the bedding structure comprises a mattress.

18. The animal soothing system of claim 14, wherein the bedding structure comprises a pillow.

19. The animal soothing system of claim 14, wherein the rhythmic vibrations comprises sound waves generated in a pattern simulating the sound of a beating heart.

* * * * *